B. W. KADEL.
CAR TRUCK.
APPLICATION FILED JAN. 23, 1922.

1,414,958.

Patented May 2, 1922.
2 SHEETS—SHEET 1.

Witness
Edwin L. Bradford

Inventor
B. W. Kadel
By
his Attorney

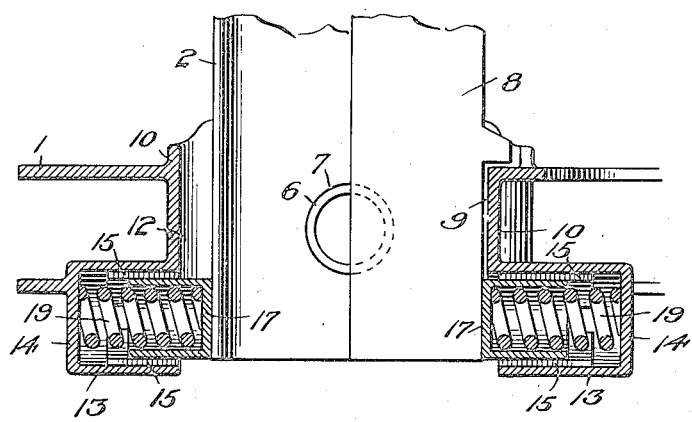
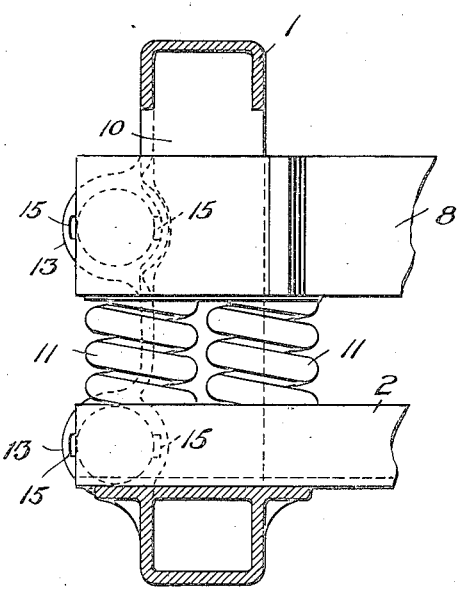
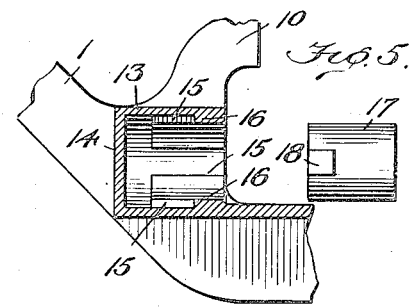
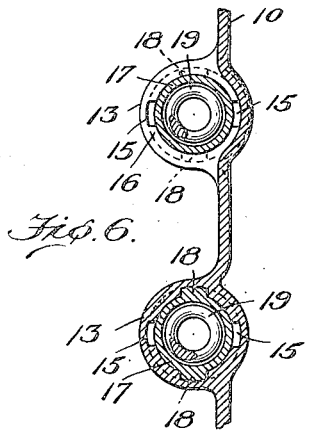

UNITED STATES PATENT OFFICE.

BYERS W. KADEL, OF BALTIMORE, MARYLAND, ASSIGNOR TO THE T. H. SYMINGTON COMPANY, OF NEW YORK, N. Y., A CORPORATION OF DELAWARE.

CAR TRUCK.

1,414,958.  Specification of Letters Patent.  Patented May 2, 1922.

Application filed January 23, 1922. Serial No. 531,236.

*To all whom it may concern:*

Be it known that I, BYERS W. KADEL, a citizen of the United States, residing in the city of Baltimore, and State of Maryland, have invented certain new and useful Improvements in Car Trucks; and I do hereby declare the following to be a full, clear, and exact description of the invention, such as will enable others skilled in the art to which it appertains to make and use the same.

My invention relates to flexible car trucks of a type in which truck squaring mechanism embodying an improved yieldable means, is provided for resisting displacement movement of either or both of the truck side frames from normal position, said yieldable means acting to cushion the displacement shock and also serving to restore the side frame members to normal position.

As is well known, the passage of a truck around a curve causes relative movement, usually longitudinally of the truck side frames which results in throwing the truck out of square and consequently increases the flange pressure of the truck wheels upon the rails, causing as a result rapid wear of the wheels and the heads of the rails. Similar effects result from the truck passing over bad rail joints and defective switch points. By my invention the flange wear of the wheels of a flexible truck is minimized and the wear of the rails also reduced.

The principal object of the invention, generally stated, is to provide means associated with the bolster and spring plank for effecting the restoration of the side frame members to normal square position, said means also serving to cushion the blows or shocks incident to the displacement movement of the side frames from normal square position.

The principal feature of the invention by which this object is accomplished consists in providing yieldable devices interposed between the side frame members and the outer end portions of the bolster and spring plank, or but one of them.

A further feature of the invention is to locate the yieldable means upon the outside of the side frame members thereby permitting ready access to the parts for purposes of inspection and repair.

There are still further features involving simplicity of construction and assembly, as will hereinafter appear.

In the drawings wherein is illustrated an embodiment of my invention, the scope whereof is pointed out in the claims:—

Fig. 3 is a horizontal sectional view on the line 3—3 of Fig. 2.

Figure 4 is a vertical transverse sectional view on the line 4—4 of Fig. 2.

Fig. 5 is a fragmentary view of one side frame member showing the spring abutment in section and the follower detached therefrom, and Fig. 6 is a vertical transverse sectional view on the line 6—6 of Fig. 2.

Figure 1:
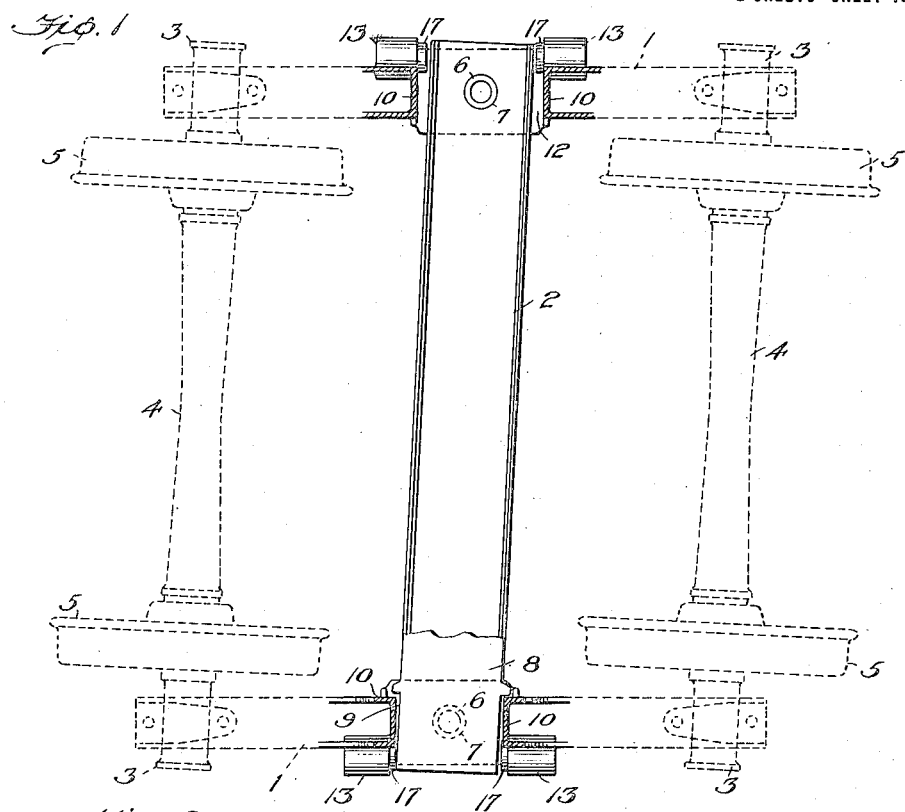
Fig. 1 is a plan view, partly in section, of a car truck, with my improved squaring mechanism applied thereto, the several parts being shown in the angular relations they assume when passing around a curve.

The car truck shown in the drawings includes the side frame members 1—1, which are transversely connected by means of the spring plank 2, so as to permit of relative independent movement longitudinally and otherwise of the truck. Each side frame is provided at its opposite ends with journal boxes (not shown) into which extend the journal ends 3 of axles 4 carrying truck wheels 5.

The spring plank preferably serves as the connecting means between the side frame members, each end thereof being pivotally attached to each side frame 1 by means of a pivot boss 6 extending upwardly from each side frame and entering a correspondingly shaped opening or pivot bearing 7 provided on each end of the spring plank.

The truck bolster 8 which may be of the type usually employed on flexible trucks, spans the side frame members, the ends of said bolster projecting through the bolster openings 9 formed between the columns 10. The space between said columns is sufficiently large to permit the bolster to turn through the required angle corresponding to the displacement movement from the normal position given the side frame members. The bolster 8 is yieldingly supported by vertically disposed springs 11 in the usual manner. Each bolster opening 9 is enlarged at its lower portion, as indicated by the numeral 12, and the ends of the spring plank 2, which latter is slightly wider than the bolster 8, extend into and project beyond said opening, as shown. The portion 12 of the bolster opening is of a size sufficient to permit the spring plank to change its angular relation to the side frame members.

The yieldable means for receiving and resisting the displacement movement of the side frames includes spring devices located upon the outside of said side frame members and arranged for engagement with the opposite sides of the bolster and spring plank upon the outer ends thereof. Each spring device comprises an abutment, a follower, and a spring interposed between said abutment and follower. A tubular housing 13 is preferably formed integral with the side frame members, and constitutes the relatively fixed spring abutment. The housing is provided with the end or abutment wall 14, and is interiorly grooved, as indicated at 15 in Fig. 5. The grooved portions 15 terminate short of the end abutment wall 14 and shoulders 16 are provided near the opposite open end of the housing.

A follower 17 is slidingly associated with each housing, lugs 18 being provided on said follower for coaction with the grooves 15 and shoulders 16 to form a quick detachable or bayonet connection between the follower and spring abutment.

The spring 19 is horizontally positioned within the housing 13 and retained therein under initial compression by means of the follower which is slid into said housing and partially rotated so as to permit the lugs 18 to move into position against the shoulders 16 and limit the outward movement of said follower.

The spring devices are oppositely arranged for engagement with the extreme outer and opposite side faces of the spring blank and bolster, and in the case of the spring plank, they bear at points outside of the pivotal connection between said spring plank and side frame members. In some cases, however, it will not be necessary to utilize the spring devices upon both the spring plank and the bolster, as spring abutments of the type disclosed will function effectively upon either of the said truck parts separate from the other.

Figure 2:
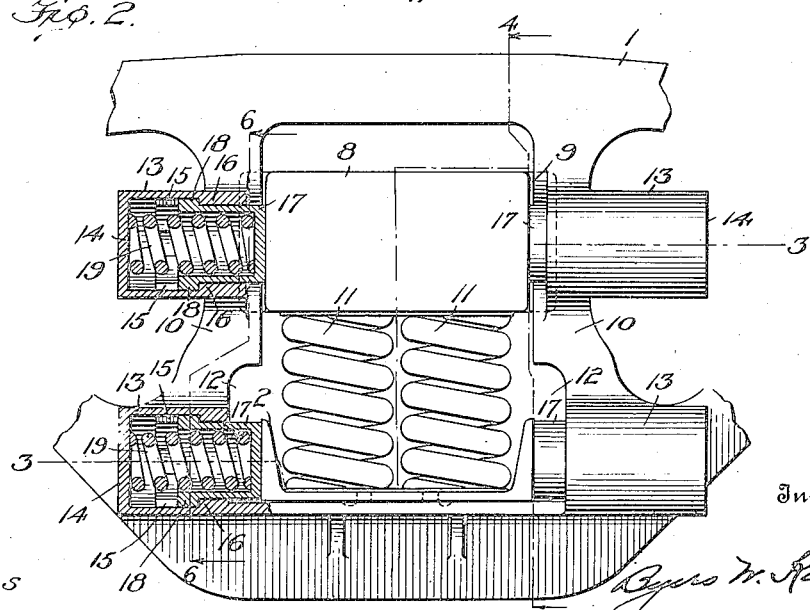
Fig. 2 is a view partly in elevation and partly in section, showing the yieldable devices engaging the ends of the spring plank and bolster.

In use a truck embodying the mechanism described will operate in the following manner upon displacement movement by the side frame members from normal position. The relative displacement of the side frames causes the transverse connecting means 2 and the bolster 8 to change their angular relation to said side frame members, as shown in Fig. 1. When this occurs the opposite spring devices at the respective opposite ends of the spring plank and bolster are engaged by the outer opposite ends of said truck parts, thereby further energizing the initially compressed springs 19 for purposes of rapidly restoring the side frames to normal position upon cessation of the action of displacement forces. The compressing or energizing movement of the ends of the spring plank and bolster functioning in the nature of levers against the spring devices, also serves to cushion the displacement shock or blow. Beyond a certain point which is preferably the normal square position of the truck with the spring devices engaging the spring plank and bolster, as shown in Fig. 2, all outward movement of the followers is limited when the opposite ends of the spring plank and bolster swing away from their respective spring abutments. It will be obvious, therefore, that the springs cannot counteract the efforts of the energized springs in returning the side frame members to normal square position.

The spring abutments, and more particularly the followers 17, slidingly contact and engage the opposite faces of the spring plank and bolster, thereby permitting freedom of action of said spring plank and bolster independently of each other and without interference with the performance of their usual functions.

If the side frame members of the truck are forced out of square position in a direction opposite to that shown in the drawings, the oppositely disposed spring abutments will receive the displacement shock and become energized for purposes of restoring the side frames to normal position.

I claim :—

1. In a car truck, the combination with movable side frame members, of means including a spring plank connecting said side frame members, a bolster for said truck, and yieldable means adapted to bear against the ends of said spring plank and bolster for resisting displacement movement of the side frame members from normal position, said means also serving to restore the side frame members to normal position upon cessation of said displacement movement.

2. In a car truck, the combination with movable side frame members, of means including a spring plank connecting said side frame members, a bolster for said truck, and means operably associated with said spring plank and bolster for receiving and cushioning displacement shocks from said side frame members, said means also acting to impart restoration movement to the side frame members for returning them to normal position upon cessation of the displacement movement.

3. In a car truck, the combination with movable side frame members, of means transversely connecting said side frame members, and means yieldingly operable against the outer ends of said transverse connecting means for resisting displacement movement of the said side frame members.

4. In a car truck, the combination with movable side frame members, of means transversely connecting said side frame members, and means yieldingly operable against opposite sides of the said transverse connecting means at the outer ends thereof for resisting displacement movement of the said side frame members.

5. In a car truck, the combination with movable side frame members, of means transversely connecting said side frame members, and means yieldingly engaging the opposite sides of said transverse connecting means at the ends thereof, a portion of said means being energized by the displacement movement of said side frame members, while the remaining portion of said yielding means remains unaffected, the said energizing portion of said yielding means acting to restore the side frame members to normal position.

6. In a car truck, the combination with movable side frame members, of means including a spring plank pivotally connecting said side frame members, and means yieldingly engaging one end of said spring plank at a point outside of the pivotal connection of said spring plank and side frame members for resisting displacement movement thereof, said means also acting to restore said side frame members to normal position.

7. In a car truck, the combination with movable side frame members, of means including a spring plank pivotally connecting said side frame members, and means yieldingly engaging each end of said spring plank at points outside of the pivotal connection of said spring plank and side frame members for resisting displacement movement thereof, said means also acting to restore said side frame members to normal position.

8. In a car truck, the combination with movable side frame members, of means including a spring plank pivotally connecting said side frame members, and means yieldingly engaging opposite sides of said spring plank at the outer ends thereof and outside of the pivotal connection of said spring plank and side frame members for resisting displacement movement of the latter, said means also acting to restore said side frame members to normal position.

9. In a car truck, the combination with side frame members, of means including a spring plank movably connected to said side frame members, a bolster for said truck, springs interposed between said spring plank and bolster for supporting the latter, and means yieldingly engaging the ends of said spring plank and bolster for resisting displacement movement of said side frame members, said means also acting to return said side frame members to normal position.

10. In a car truck, the combination with side frame members, of means including a spring plank movably connected to said side frame members, a bolster for said truck, yieldable means vertically supporting said bolster, and means yieldingly and horizontally engaging the ends of said bolster and spring plank for resisting displacement movement of said side frame members, said means also acting to return said side frame members to normal position.

11. In a car truck, the combination with side frame members, of means including a bolster interposed between said side frame members and movable angularly with relation thereto, means for yieldingly supporting said bolster, and means engaging one side of said bolsters at the outer end thereof for yieldingly resisting displacement movement of either or both of said side frame members.

12. In a car truck, the combination with side frame members, of a spring plank movably connecting said side frame members, a bolster for said truck, and spring devices horizontally arranged to bear against the opposite side faces of said bolster and spring plank at their outer ends, said spring devices being energized upon the displacement movement of the side frame members from normal position.

13. In a car truck, the combination with side frame members, of a spring plank movably connecting and projecting beyond said side frame members, and yieldable means located upon the outside of said side frame members, said means being arranged to engage the projecting ends of said spring plank for resisting displacement movement of the side frame members from normal position.

14. In a car truck, the combination with side frame members, of means movably connecting said side frame members, a bolster for said truck interposed between said side frame members and having the ends thereof projecting beyond said side frame members, and yieldable means located upon the outside of said side frame members, said yieldable means being arranged to engage the projecting ends of said bolster for resisting displacement movement of the side frame members from normal position.

15. In a car truck, the combination with independently movable side frame members, of means connecting said side frame members, and yieldable means for resisting displacement movement of said side frame members, said yieldable means including oppositely disposed spring abutments provided on the outside of each of said side frame members, followers for engaging opposite faces of the said connecting means at the opposite outer ends thereof, and springs interposed between said followers and spring abutments.

16. In a car truck, the combination with movable side frame members, of means connecting said side frame members, and yieldable means for resisting displacement movement of said side frame members, said yieldable means including fixed spring abutments provided on each of the side frame members, and springs interposed between said fixed abutments and the outer ends of said connecting means, said springs being initially compressed before being interpositioned as aforesaid.

17. In a car truck, the combination with movable side frame members, of means connecting said side frame members, and yieldable means for resisting displacement movement of said side frame members, said yieldable means including fixed spring abutments provided on each of the side frame members, and spring devices interposed between said abutments and said connecting means for slidingly engaging the latter.

18. In a car truck, the combination with movable side frame members, of means connecting said side frame members, and yieldable means for resisting displacement movement of said side frame members, said yieldable means including fixed spring abutments provided on each of the side frame members, followers for engaging opposite faces of said connecting means, said followers being detachably held within said abutments, and springs interposed between said followers and abutments.

In testimony whereof I affix my signature.

BYERS W. KADEL.